United States Patent [19]

Lee

[11] Patent Number: 4,905,582
[45] Date of Patent: Mar. 6, 1990

[54] PORTABLE, FOLDABLE ROASTER OVEN

[76] Inventor: Chung-Hwa Lee, No. 22, 2F Ling An Rd., Kachsiung City, Taiwan

[21] Appl. No.: 317,187

[22] Filed: Feb. 28, 1989

[51] Int. Cl.$^4$ ............ A47J 37/04; A47J 37/07; F24C 1/16
[52] U.S. Cl. ............................ 99/419; 99/450; 126/9 R
[58] Field of Search .............. 99/419, 421 R, 421 H, 99/421 HV, 385, 393, 399, 450, 421 HH, 421 M, 421 P, 421 V; 126/25 R, 30, 26, 9 R, 9 A, 9 B, 38, 37 B, 59, 29, 65; 312/258, 257.1

[56] References Cited

U.S. PATENT DOCUMENTS

| 986,063 | 3/1911 | Jacobs | 126/9 R |
| 1,952,749 | 3/1934 | Ellis | 126/24 X |
| 2,467,480 | 4/1949 | Hudson | 126/9 R |
| 3,005,451 | 10/1961 | Richart | 126/9 R X |
| 3,059,568 | 10/1962 | Fortis | 126/9 R X |
| 3,182,585 | 5/1965 | Rensch et al. | 99/421 HX |
| 4,548,192 | 10/1985 | Hsu | 126/9 R X |

FOREIGN PATENT DOCUMENTS

| 507939 | 1/1955 | Italy | 126/9 R |
| 584024 | 1/1977 | Switzerland | 99/421 H |

Primary Examiner—Harvey C. Hornsby
Assistant Examiner—Scott J. Haugland

[57] ABSTRACT

A portable, foldable roaster oven comprising two side plates, a front plate, a rear plate, a bottom plate, a fire net, a roasting net and a food preserving net, movably combined together so that said front and rear plates and said side plates are possible to be folded down to lie on the bottom plate sandwiching said three nets to become a thin flat unit, convenient for carrying.

2 Claims, 6 Drawing Sheets

PORTABLE, FOLDABLE ROASTER OVEN

BACKGROUND OF THE INVENTION

As a portable and foldable roaster oven has rarely seen, this invention has been devised, aiming to give it the following features.
1. Easy to spread out. All the components are positionally made different and movably combined together so that they are easy to be spread out to be assembled.
2. Convenient to be folded down for carrying. To fold down this oven, at first fold down inward the front and the rear plates and then fold down inward both the side plates and lastly then push them ineard with the slide buttons sliding along the sliding slots. Then this oven becomes very thin, not spacious and convenient for carrying.
3. Designed to keep roasted food warm. A food preserving net is provided at the upper section of the oven for keeping roasted food on before eaten.

SUMMARY OF THE INVENTION

This portable, foldable roaster oven in accordance with the present invention comprises a bottom plate, a front plate, a rear plate, two side plates, a fire net, a roasting net and a food preserving net, properly combined together so that the four plates, the front, the rear and the two side plates, can be folded down on the bottom plate to become a thin flat unit, convenient for carrying.

The front and rear plates are movably combined with the bottom plate by means of a revet fined in a L-shaped notch respectively at the lower middle edge of the front and the rear plates and in a hole in the front and the rear reinforcing strips of the bottom plate. So the front and the rear plates can be folded to stand up vertically or to lie down on the bottom plate.

The two side plates are movably combined with the bottom plate by means of a sliding button riveted in a hole in the vertical bended walls respectively at the front and the rear of the said side plates and in a sliding slot respectively at the rear and the left of reinforcing strips of the bottom plate. So said side plates can be folded to stand up or to lie down on the bottom plate when each sliding button comes to the outer end of each sliding slot. When said side plates are spread out to stand up, said vertical bended walls are to hook with upper bended horizontal strips of the front and the rear plates. When said side plates are folded down to lie on the bottom plate, they can be pushed inward until the sliding buttons slide to the inner ends of the sliding slots.

DETAILED DESCRIPTION OF THE INVENTION

Figure 1:
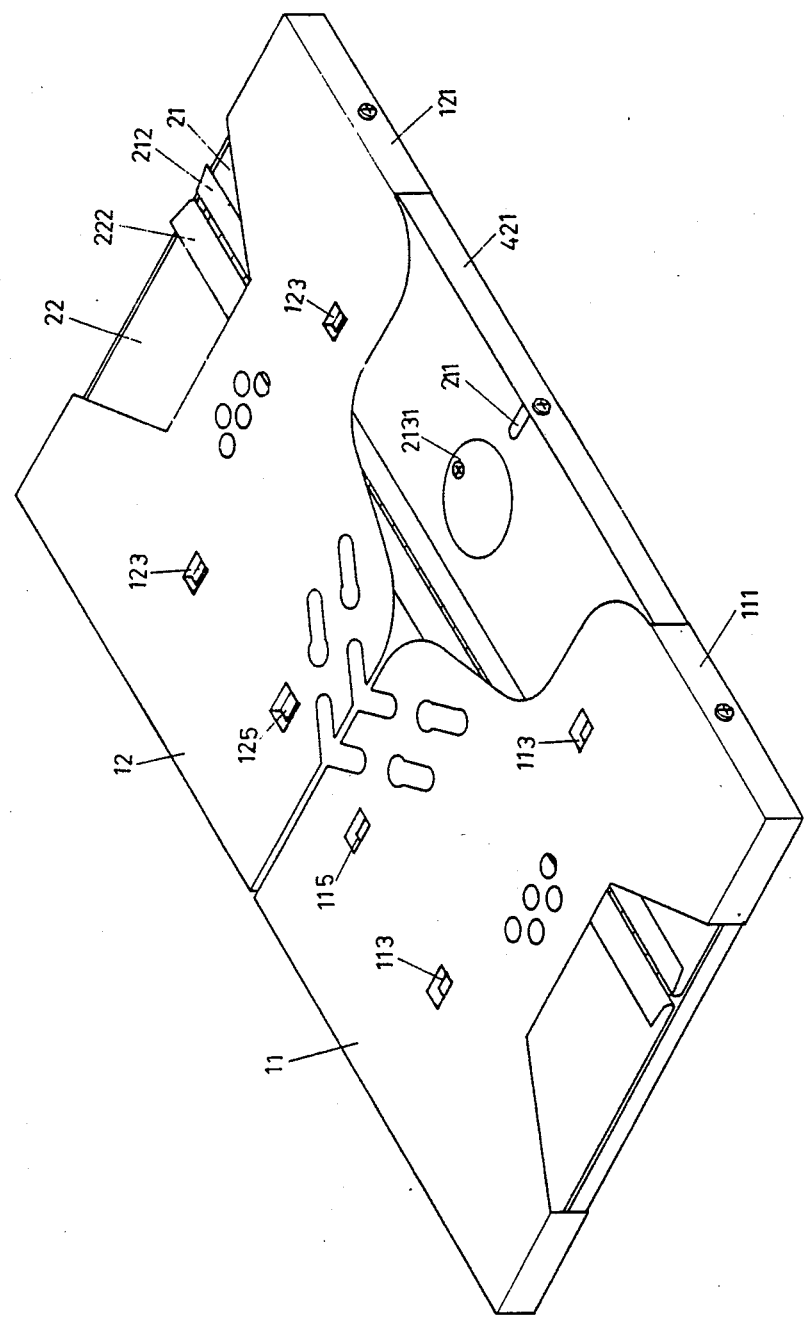
FIG. 1 is a perspective upper view of the portable, foldable roaster oven in the folded state in accordance with the present invention.
Figure 2:
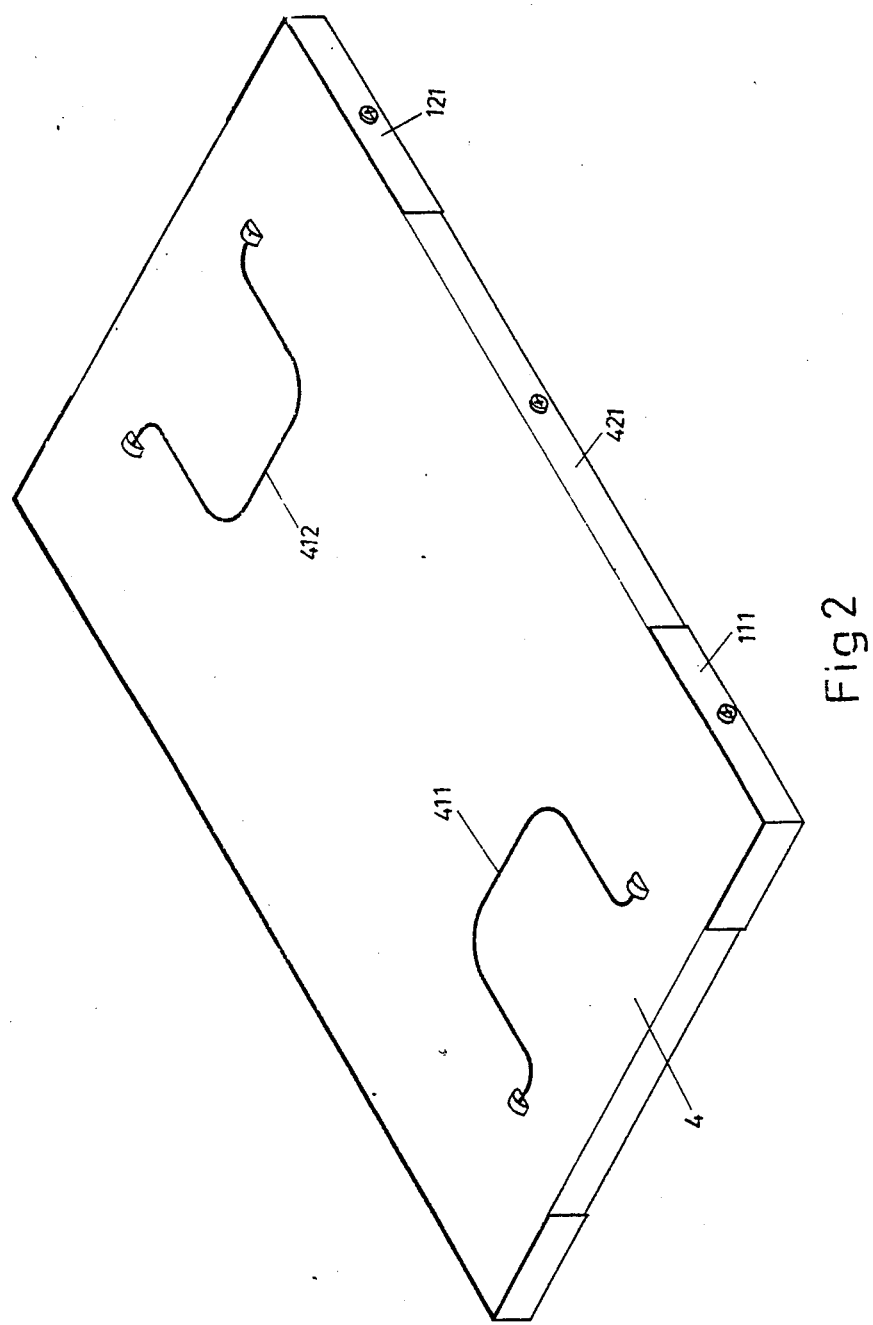
FIG. 2 is a perspective bottom view of the portable, foldable roaster oven in the folded state in accordance with the present invention.
Figure 3:
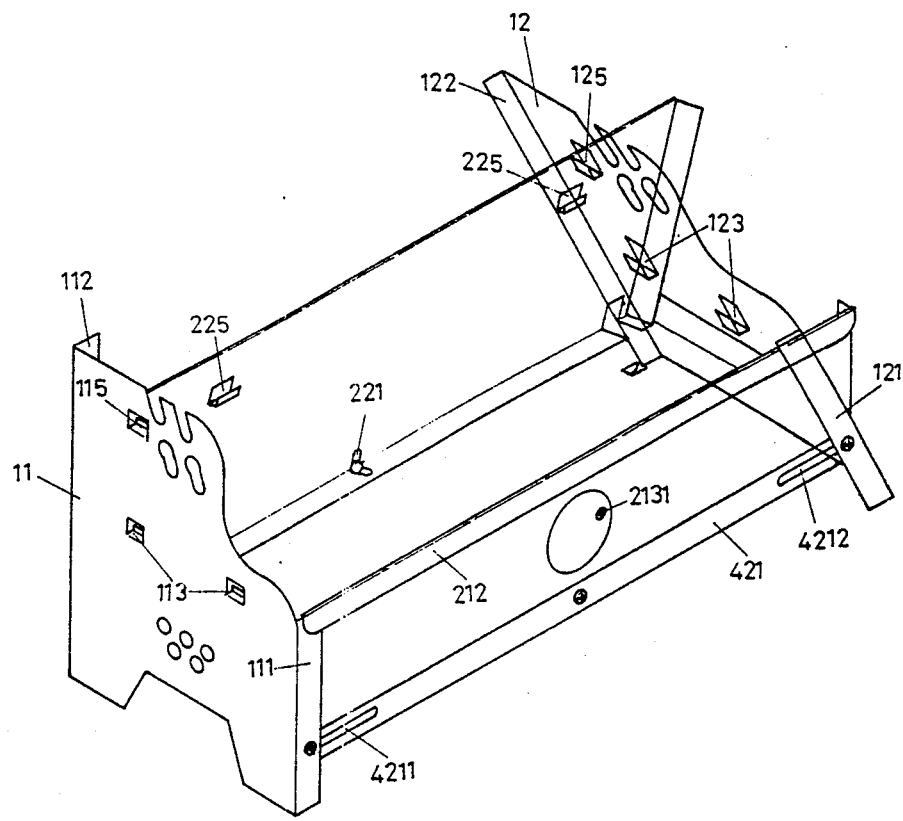
FIG. 3 is an actional view of the portable, foldable roaster oven being spread out in accordance with the present invention.
Figure 4:
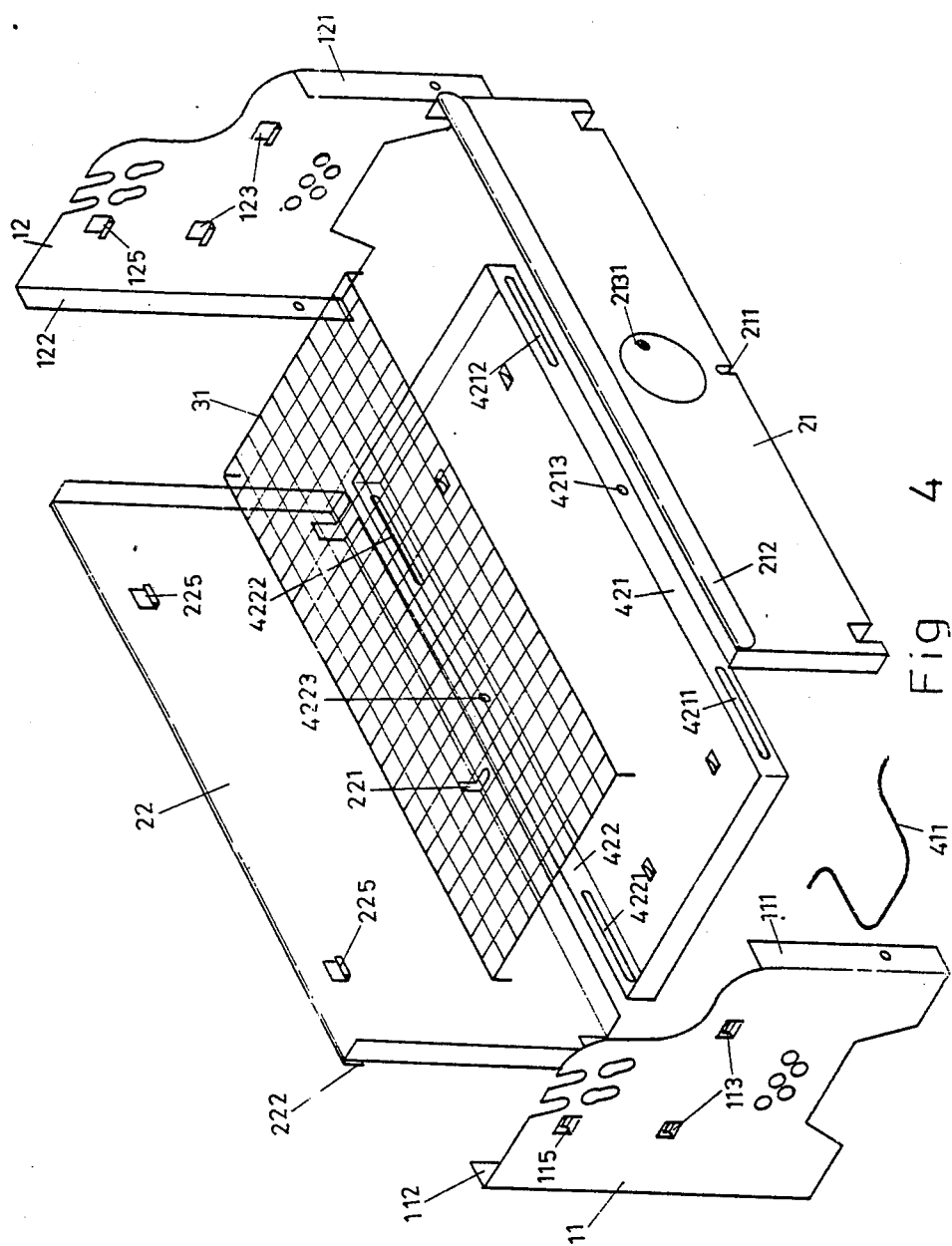
FIG. 4 is an exploded perspective view of the portable, foldable raster oven in accordance with the present invention.

The portable, foldable roaster oven in accordance with the present invention, as shown in FIGS. 1, 2, and 3, comprises two side plates 11, 12, a frant plate 21, a rear plate 22, a fire net 31, a roasting net 32, a food preserving net 33 and a bottom plate 4 as its main parts.

When this oven is in the folded state, the two side plates 11, 12 are folded down at the most outside, then the front and the front and the rear plates are folded down under the side plates 11, 12, and the fire net 31, the roasting net 32 and the food preserving net 33 are sandwiched between the bottom plate 4 and the front plate 21 as shown in FIG. 1. Two carrig handles 411, 412 are provided on the rear face of the bottom plate 4 for carrying this oven in the folded state.

The two side plates 11, 12 are provided with bended vertical walls 111, 112, 121, 122, and sliding buttons 1111, 1121, 1211, 1221 are separately provided on these walls 111, 112, 121, 122, (the sliding buttons 1121, 1221 are not shown in the figures, but they are on the walls 112, 122 opposite to those 1111, 1121). These sliding buttons 1111, 1121, 1211, 1221 are movably riveted in sliding slots 4211, 4212, 4221, 4222 in reinforcing strips 421, 422 fixed at the front and the rear sides of the bottom plate 4. When the two side plates 11, 12 are in the folded state, the sliding buttons 1111, 1121, 1211, 1221 are respectively located at the inner end of the sliding slots 4211, 4121, 4221, 4222; but when said plates 11, 12 are pulled outward until said buttons slide to the outer ends of said slots, then said side plates can be stopped and be spread out for 90 degrees to stand vertical as shown in FIG. 3. And the lower ends of side plates 11, 12 can serve as the feet for this oven to stand on the ground.

The front and the rear plates 21, 22 are provided with L-shaped notches at the lower middle edges for rivets 214, 224 to go through to combine said plates 21, 22 movably with the bottom plate 4 having reinforcing strips 421, 422, which have holes 4213, 4223 for the rivets 214, 224 5o pass through in being combined with said plates 21, 22. Besides, said plates 21, 22 are provided with bended horizontal strips 212, 222 to hook with the bended vertical walls 111, 121, 112, 122 so that said plates 21, 22 can be assembled with the said side plates 11, 12 after spread out in the vertical position.

The roasting net 32 is to be placed on protrusions 113, 123 set set on the inner faces of the side plates 11, 12 and the food preserving net 33 is to be placed on protrusions 115, 125 set on the inner faces of the side plates 11, 12 and on protrusions 225 set on the inner face of the rear plate 22. In addition, a ventilating opening 213 is provided in the front plate 21 covered with a lid 2131, which is to be opened when this oven is to be used.

Figure 5:
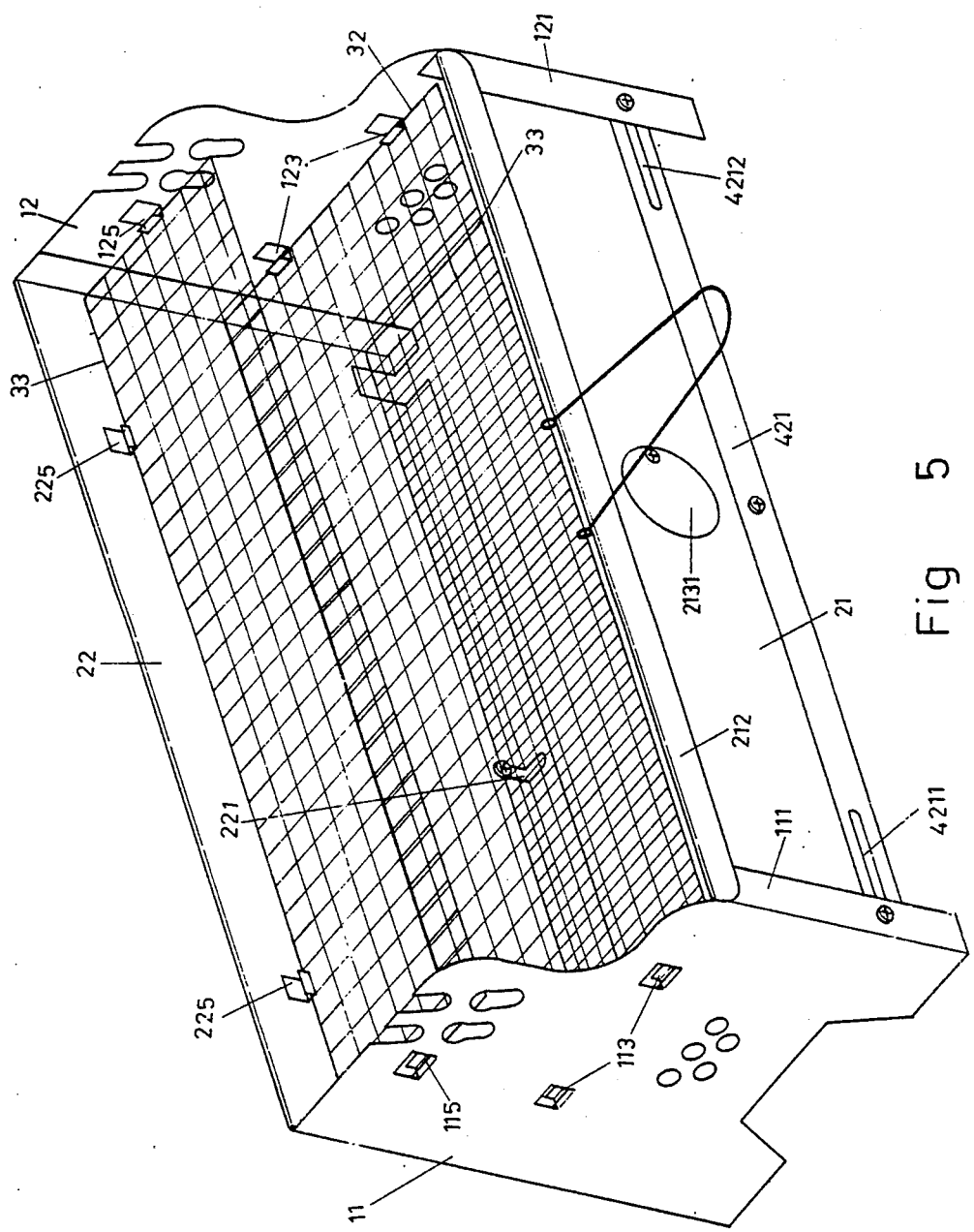

When this oven in the spread-out state shown in FIG. 5 is to be folded down as shown in FIG. 1, the reverse procedure to what has been described can attain its purpose.

Figure 6:
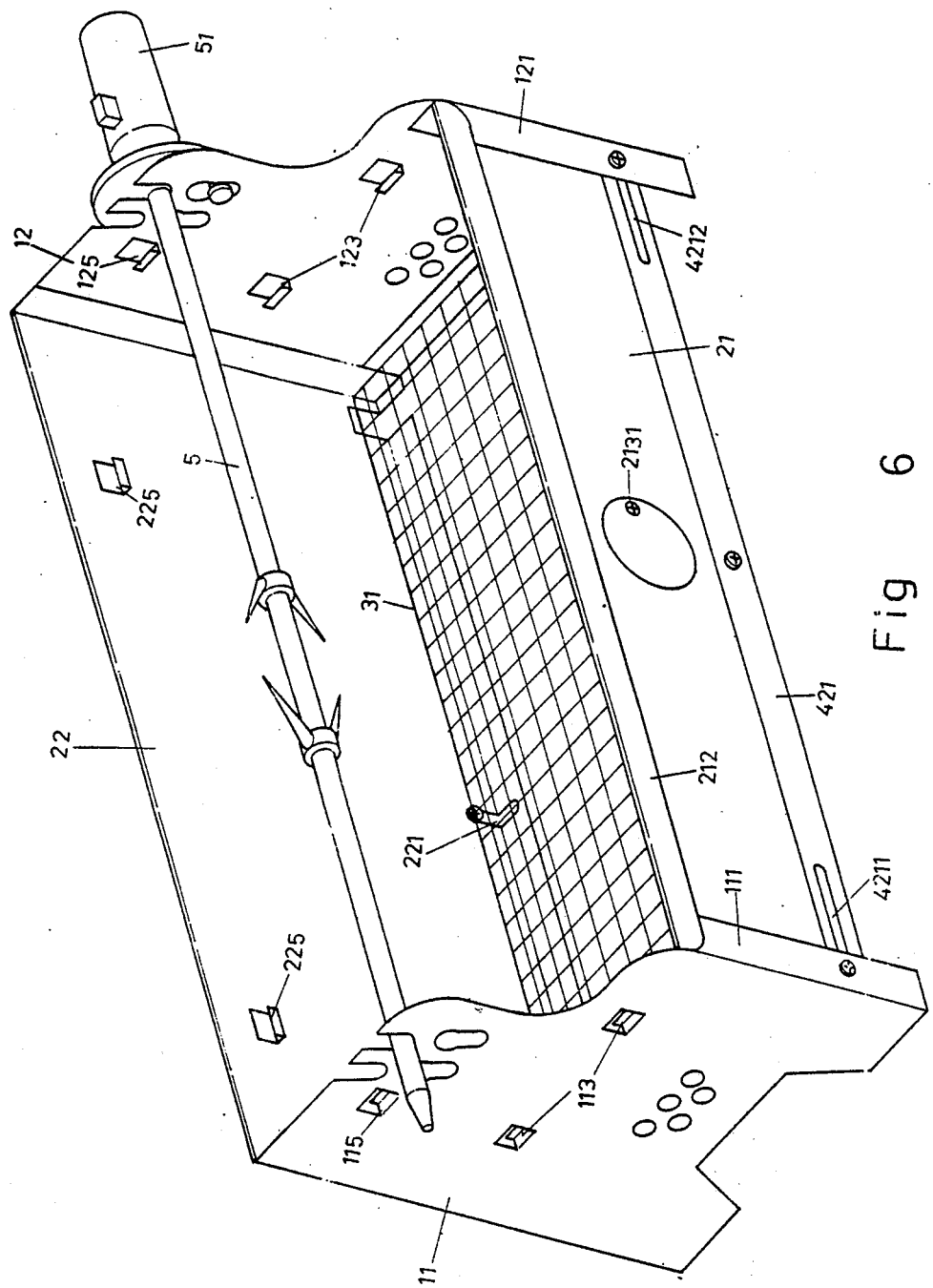

As shown in FIG. 6, in case of roasting a whole chicken or duck, a roasting bar 5 is attached to this oven. Then the roasting net 32 and the food preserving net 33 are to be taken off and the roasting bar 5 is to be put between both the side plates 11, 12 and a self-rotating motor 51 can be combined with the bar 5 for rotating it.

The food preserving net 33 has to be such placed at the upper section of this oven that it can be reached by the rising heat of the fire so as to keep warm roasted food temporarily put thereon before eaten.

What is claimed is:

1. A portable, foldable roaster oven comprising;

two side plates provided with vertical bent walls at the front and the rear, a small hole in each of said vertical bent walls, a rivet received in each hole, a bottom plate provided at the front and the rear edges with reinforcing strips each having a sliding slot in right and left portions thereof, each rivet passing through one said sliding slot in the bottom plate and each rivet after fixed becoming a sliding button to slide in said sliding slot so that the two side plates may be moved inward or outward after being folded down flat;

a front plate and a rear plate both provided with an L-shaped notch at the lower middle edge to be movably combined by rivets with the bottom plate so that both said front and rear plates may be folded down or out for 90 degrees and also provided with a bent horizontal strip to hook with the vertical bent walls of the two side plates, and only the front plate provided with a ventilating hole; and a fire net, a roasting net and a food preserving net.

2. The portable, foldable roaster oven as claimed in claim 1, wherein, the food preserving net is provided at an upper section of the oven for roasted food taken from the roasting net to be temporarily kept on, warmed by the rising heat from the fire and prevented from over-roasting.

* * * * *